United States Patent
Bi et al.

(10) Patent No.: US 6,387,531 B1
(45) Date of Patent: May 14, 2002

(54) METAL (SILICON) OXIDE/CARBON COMPOSITE PARTICLES

(75) Inventors: Xiangxin Bi, San Ramon; Sujeet Kumar, Fremont; Nobuyuki Kambe, Menlo Park, all of CA (US)

(73) Assignee: NanoGram Corporation, Fremont, CA (US)

( * ) Notice: Subject to any disclaimer, the term of this patent is extended or adjusted under 35 U.S.C. 154(b) by 0 days.

(21) Appl. No.: 09/123,255

(22) Filed: Jul. 27, 1998

(51) Int. Cl.[7] .............................. B32B 5/16; C01B 33/12; C01B 31/00
(52) U.S. Cl. ...................... 428/570; 423/326; 423/335; 423/445 R; 423/449.1; 423/593; 423/608; 423/610; 428/402; 428/403
(58) Field of Search ................................ 428/402, 403, 428/570; 423/337, 335, 445 R, 449.1, 593, 608, 610

(56) References Cited

U.S. PATENT DOCUMENTS

| | | | |
|---|---|---|---|
| 3,406,228 A | 10/1968 | Hardy et al. | 265/0.5 |
| 3,579,310 A | 5/1971 | Lewis et al. | 23/301 |
| 3,658,539 A | 4/1972 | Dantro | 96/88 |
| 3,709,984 A | 1/1973 | Dantro | 423/610 |
| 3,749,764 A | 7/1973 | Basque et al. | 423/610 |
| 3,923,968 A | 12/1975 | Basque et al. | 423/611 |
| 3,954,945 A | 5/1976 | Lange et al. | 423/336 |
| 4,048,290 A | 9/1977 | Lee | 423/336 |
| 4,076,551 A | * 2/1978 | Bernhard et al. | 106/291 |
| 4,241,042 A | 12/1980 | Matijevic et al. | 423/610 |
| 4,548,798 A | 10/1985 | Rice | 423/263 |
| 4,558,017 A | 12/1985 | Gupta et al. | 501/96 |
| 4,574,078 A | 3/1986 | Cortesi et al. | 423/592 |
| 4,687,753 A | 8/1987 | Fiato et al. | 502/5 |
| 4,705,762 A | 11/1987 | Ota et al. | 501/87 |
| 4,732,750 A | 3/1988 | Olson et al. | 423/608 |
| 4,808,397 A | 2/1989 | Albizzati et al. | 423/608 |
| 4,842,832 A | 6/1989 | Inoue et al. | 423/211 |
| 4,944,936 A | * 7/1990 | Lawhorne | 423/612 |
| 5,013,706 A | * 5/1991 | Schramm et al. | 502/309 |
| 5,053,580 A | * 10/1991 | Schramm et al. | 585/624 |
| 5,061,473 A | 10/1991 | De Cleyn et al. | 423/610 |
| 5,062,936 A | 11/1991 | Beaty et al. | 204/164 |
| 5,108,732 A | 4/1992 | Krumbe et al. | 423/592 |
| 5,200,167 A | 4/1993 | Maeda et al. | 423/610 |
| 5,204,083 A | * 4/1993 | Magyar et al. | 423/613 |

(List continued on next page.)

FOREIGN PATENT DOCUMENTS

EP          0 202 911        3/1990

OTHER PUBLICATIONS

R. W. Siegel et al., Synthesis, Characterization, and Properties of Nanophase $TiO_2$, J.Mater.Res. 3(6): 1367–1372 (Nov./Dec. 1988).

M. Musci et al., Laser Synthesis of Vanadium–Titanium Oxide Catalysts, J.Mater.Res, 7(10):2846–2852 (Oct. 1992).

F. Curcio et al., Synthesis of Ultrafine $TiO_2$ Powders by a CW $CO_2$ Laser, Applied Surface Science, 46: 225–229 (1990).

(List continued on next page.)

*Primary Examiner*—Hoa T. Le
(74) *Attorney, Agent, or Firm*—Patterson, Thuente, Skaar & Christensen, P.A.; Peter S. Dardi; David Kleinsmith

(57) ABSTRACT

A collection of nanoscale particles are a composite of carbon and metal oxide or silicon oxide. The composite particles have an average diameter from about 5 nm to about 1000 nm, and can be produced by laser pyrolysis. The laser pyrolysis involves the formation of a molecular stream including a metal precursor, an infrared absorber, an oxidizing agent and a carbon precursor. The pyrolysis is driven by heat absorbed from a laser beam. Furthermore, nanoparticles including titanium oxide with a rutile crystal structure have been produced.

20 Claims, 13 Drawing Sheets

U.S. PATENT DOCUMENTS

| | | | | |
|---|---|---|---|---|
| 5,358,695 A | | 10/1994 | Helble et al. | 423/592 |
| 5,417,956 A | | 5/1995 | Moser | 423/592 |
| 5,443,811 A | | 8/1995 | Karvinen | 423/616 |
| 5,468,463 A | * | 11/1995 | Butje et al. | 423/612 |
| 5,536,448 A | | 7/1996 | Takahashi et al. | 252/520 |
| 5,549,973 A | | 8/1996 | Majetich et al. | 428/403 |
| 5,672,201 A | * | 9/1997 | Simpson et al. | 106/447 |
| 5,702,518 A | * | 12/1997 | Vogt et al. | 106/439 |
| 5,770,310 A | * | 6/1998 | Noguchi et al. | 428/403 |
| 5,837,050 A | * | 11/1998 | Okuda et al. | 106/439 |
| 5,938,979 A | * | 8/1999 | Kambe et al. | 252/500 |
| 5,984,996 A | * | 11/1999 | Gonsalves et al. | 75/246 |
| 6,080,337 A | * | 6/2000 | Kambe et al. | 252/521.1 |

OTHER PUBLICATIONS

Xiang–Xin Bi et al., Nanocrystalline α–Fe, $Fe_3C$, and $Fe_7C_3$ Produced by $CO_2$ Laser Pyrolysis, J.Mater.Res., 8(7): 1666–1674 (Jul. 1993).

G.W. Rice et al., Material Synthesis by Laser Heating of Gases, Specirochimica Acta., 43A(2): 299–300 (1987).

G.W. Rice et al., Zirconium Borohydride as a Zirconium Boride Precursor, J.Am.Ceram.Soc., 71(4): C–181–C–183 (Apr. 1988).

"Carbon Coating on Iron Carbide Particles Produced by Laser Pyrolysis", 20th Biennial Conference on Carbon, abstract, by Bi et al., 1991.

"Nanoscale Carbon Blacks Produced by $CO_2$ Laser Pyrolysis" by, Bi et al., J. Mater, Res., vol. 10, No. 11, Nov. 1995, pp. 2875–2884.

"Synthesis of Nanocrystalline Fe–based Particles by $CO_2$ Laser Pyrolysis" by Bi et al., Mat. Res. Soc., Symp., Proc., vol. 286, 1993, pp. 161–167.

* cited by examiner

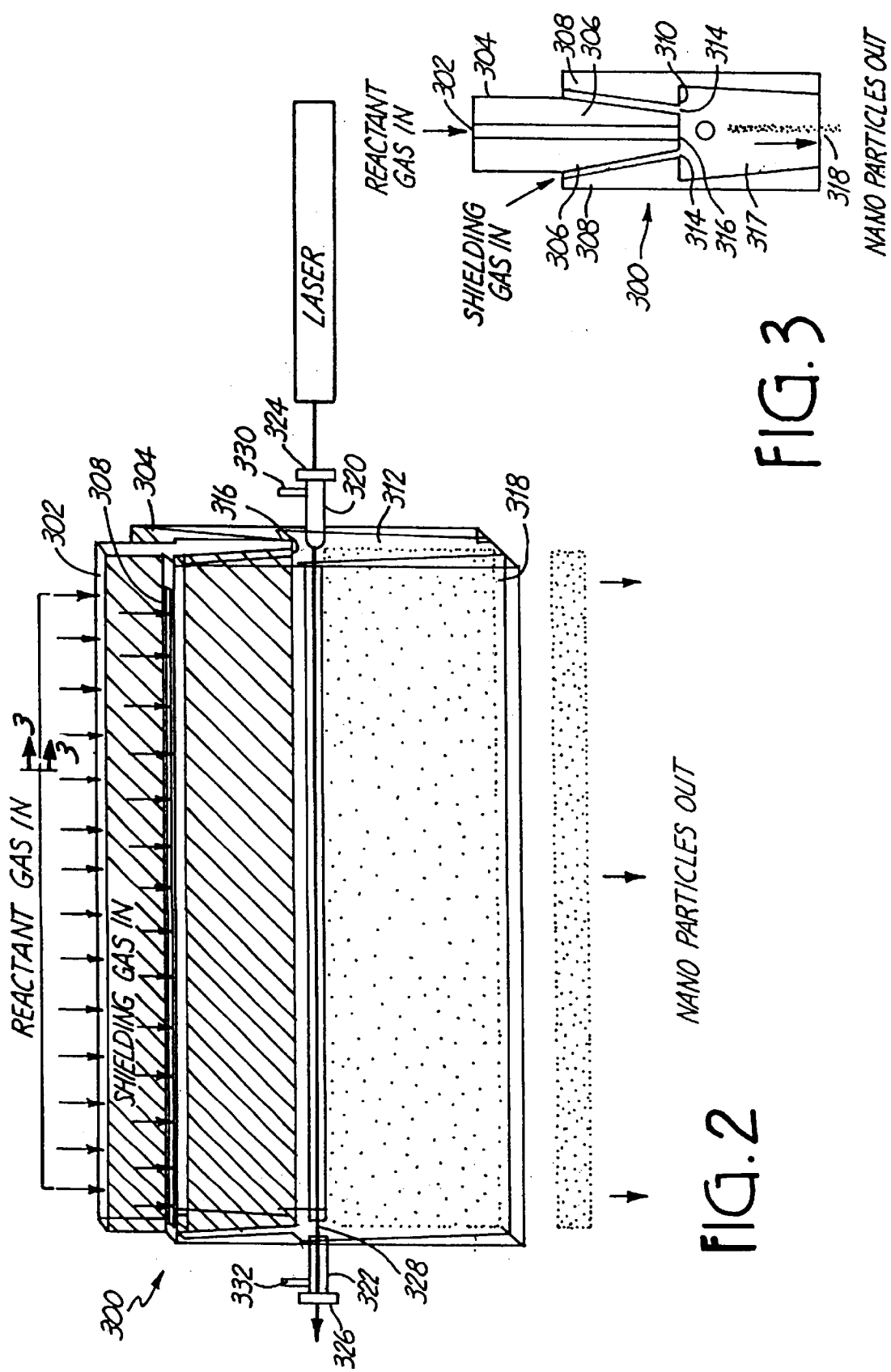

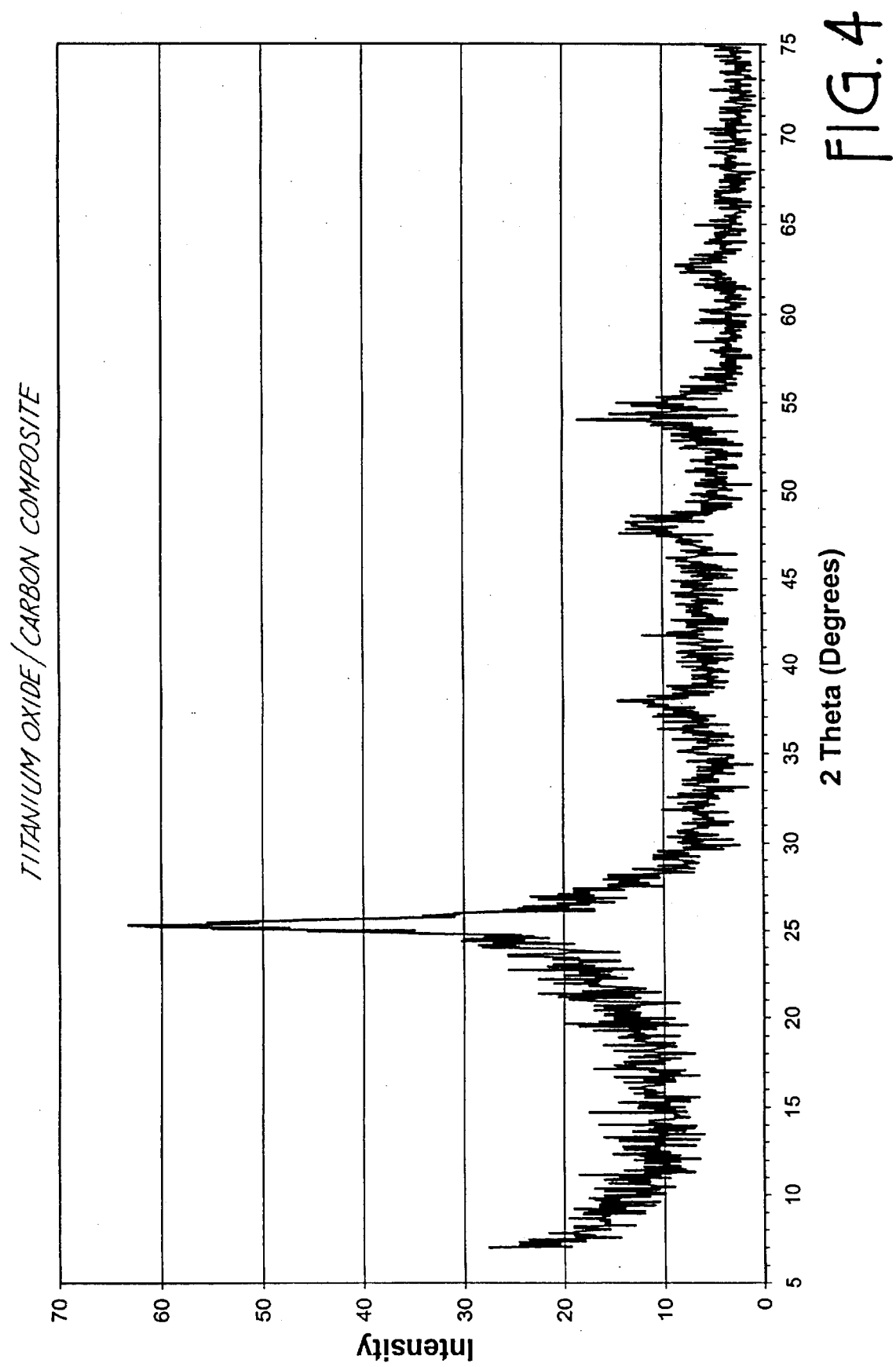

US 6,387,531 B1

METAL (SILICON) OXIDE/CARBON COMPOSITE PARTICLES

BACKGROUND OF THE INVENTION

The invention relates to powders of metal oxide with associated carbon. More particularly, the invention relates to nanoscale particles of crystalline metal oxide with associated carbon. The invention further relates to the formation of titanium oxide particles having a rutile crystalline phase.

Advances in a variety of fields have created a demand for many types of new materials. In particular, a variety of chemical powders can be used in many different processing contexts. Specifically, there is considerable interest in the application of ultrafine or nanoscale powders that are particularly advantageous for a variety of applications involving small structures or high surface area materials. This demand for ultrafine chemical powders has resulted in the development of sophisticated techniques, such as laser pyrolysis, for the production of these powders.

Ceramic powders, especially metal oxides, are of interest for a range of different applications. For example, titanium oxide powders can be used to form abrasives for the polishing of very smooth surfaces. Smooth surfaces are required in a variety of applications in electronics, tool production and many other industries. As miniaturization continues even further, even more precise polishing may be required. Current submicron technology requires polishing accuracy on a nanometer scale. Precise polishing technology can employ chemical-mechanical polishing involving a polishing composition that acts by way of a chemical interaction of the substrate with the polishing agents as well as an abrasive effective for mechanical smoothing of the surface.

SUMMARY OF THE INVENTION

In a first aspect, the invention features a collection of particles comprising:
 a) metal oxide or silicon oxide, and;
 b) at least about 1 percent by weight carbon, the collection of particles having an average diameter from about 5 nm to about 1000 nm.

In another aspect, the invention features a method of producing particles comprising a metal oxide and a carbon deposit, the method including pyrolyzing a molecular stream in a reaction chamber, the molecular stream including a metal precursor, an infrared absorber, an oxidizing agent and a carbon source, where the pyrolysis is driven by heat absorbed from a laser beam.

In another aspect, the invention features a collection of nanoparticles, the nanoparticles comprising rutile titanium dioxide.

BRIEF DESCRIPTION OF THE DRAWINGS

FIG. 2 is a schematic, perspective view of a reaction chamber of an alternative embodiment of the laser pyrolysis apparatus, where the materials of the chamber are depicted as transparent to reveal the interior of the apparatus.

FIG. 3 is a sectional view of the reaction chamber of FIG. 2 taken along line 3—3.

FIG. 4 is an x-ray diffractogram of titanium oxide/carbon composite nanoparticles produced by laser pyrolysis under conditions specified in the first column of Table 1.

DETAILED DESCRIPTION OF THE PREFERRED EMBODIMENTS

Figure 1:
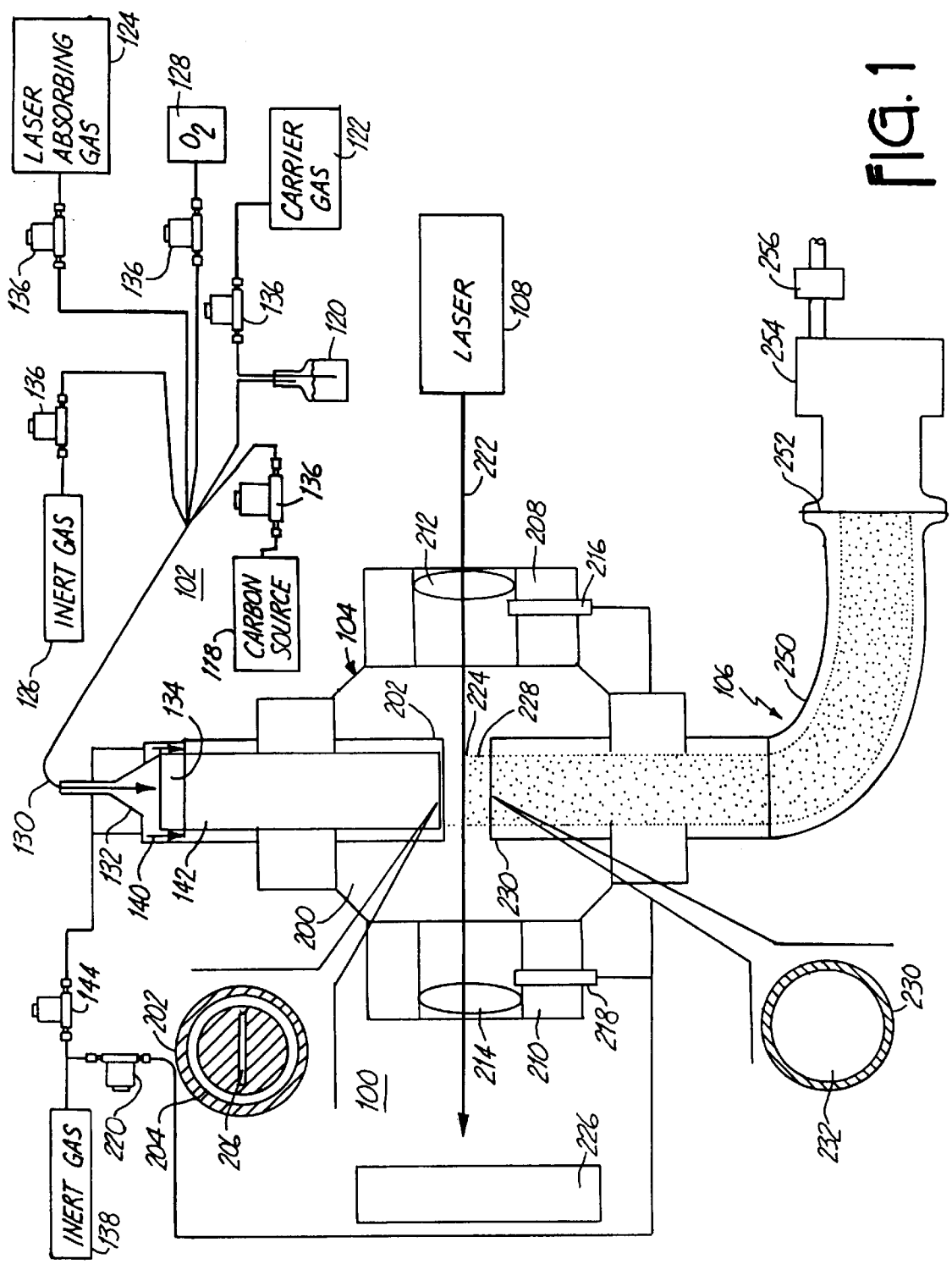
FIG. 1 is a schematic, sectional view of an embodiment of a laser pyrolysis apparatus taken through the middle of the laser radiation path. The upper insert is a bottom view of the injection nozzle, and the lower insert is a top view of the collection nozzle.
Figure 5:
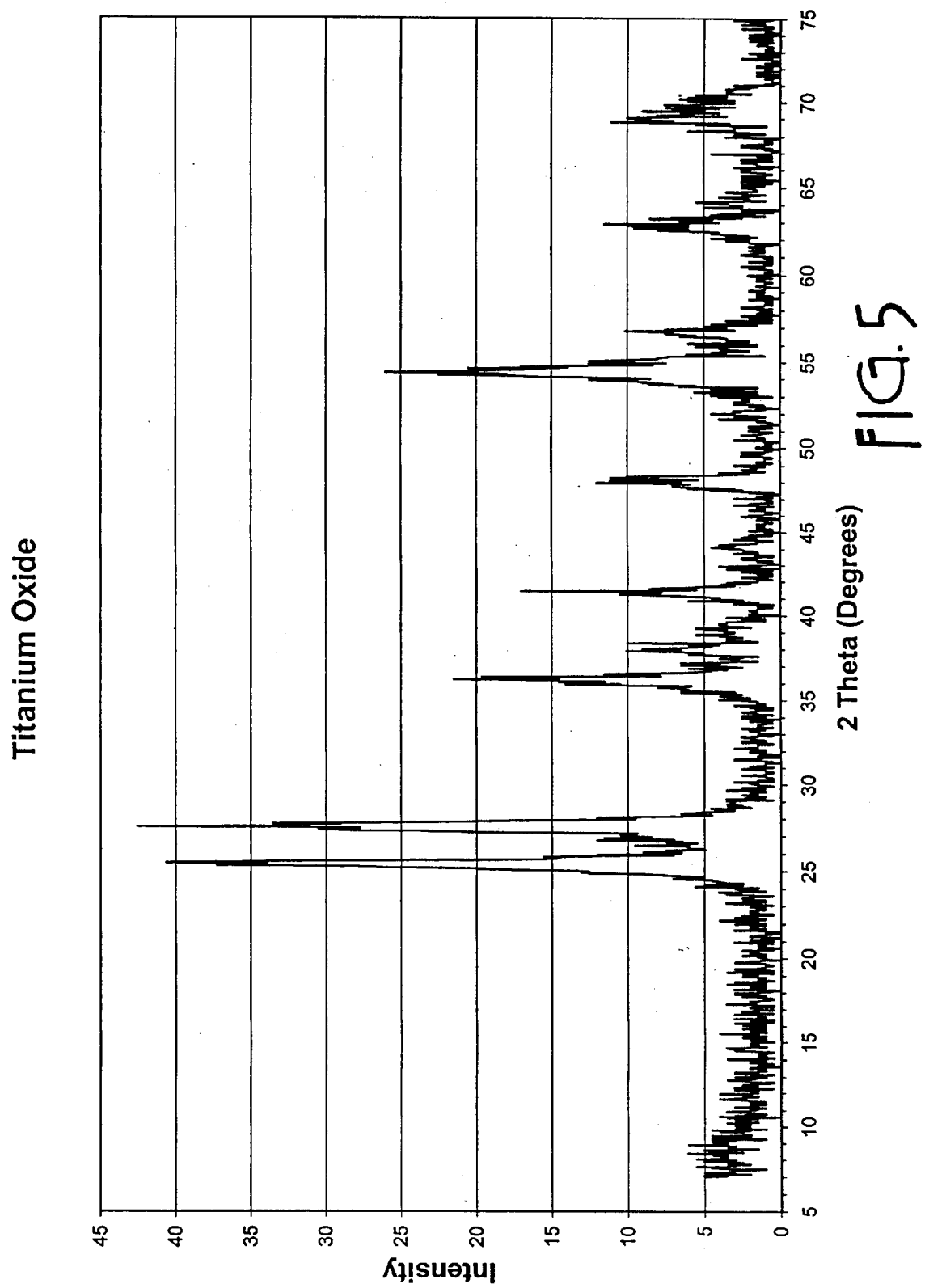
FIG. 5 is an x-ray diffractogram of titanium oxide nanoparticles produced by laser pyrolysis under conditions specified in the second column of Table 1.
Figure 6:
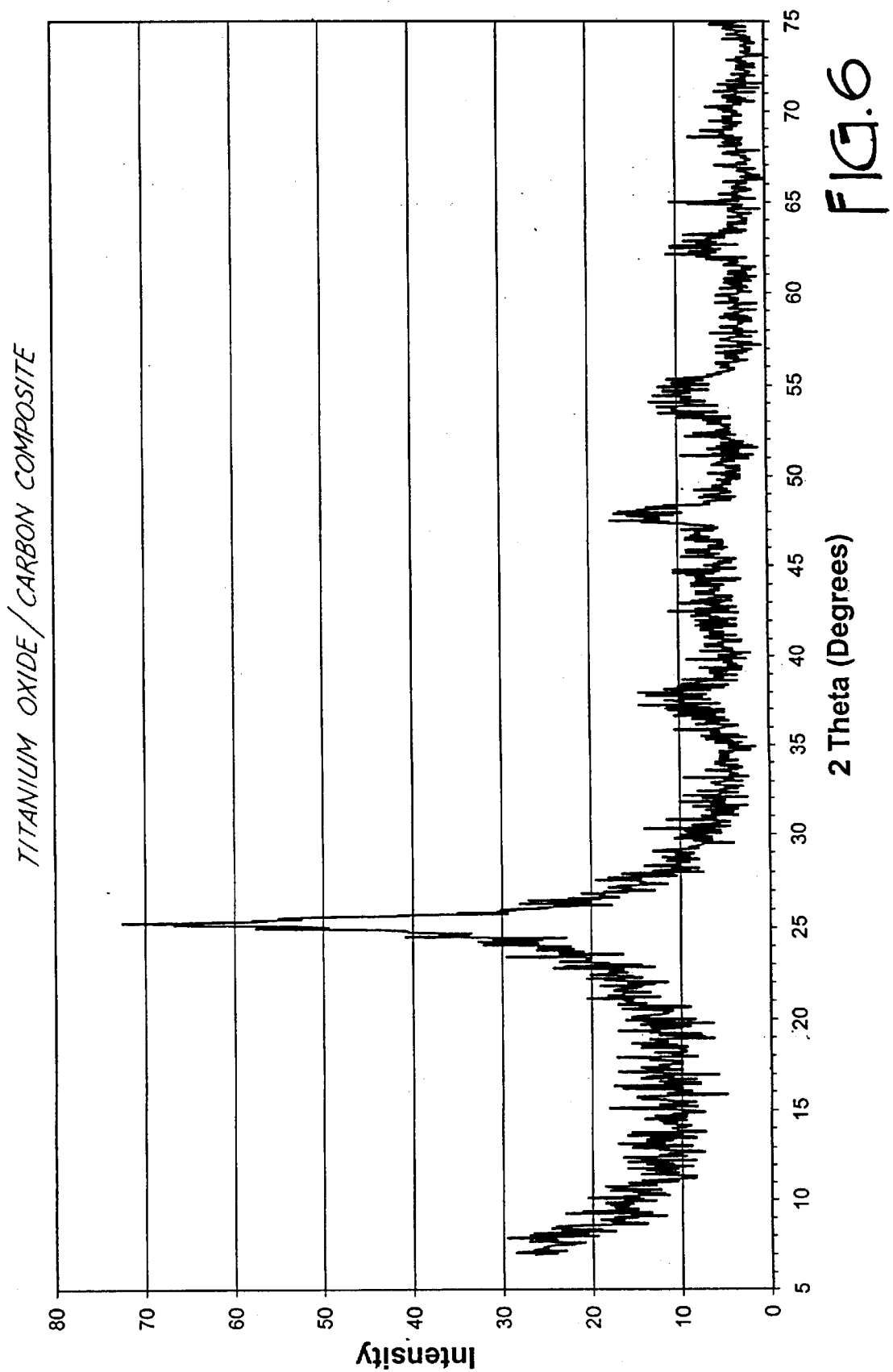
FIG. 6 is an x-ray diffractogram of titanium oxide/carbon composite nanoparticles produced by laser pyrolysis under conditions specified in the third column of Table 1.
Figure 7:
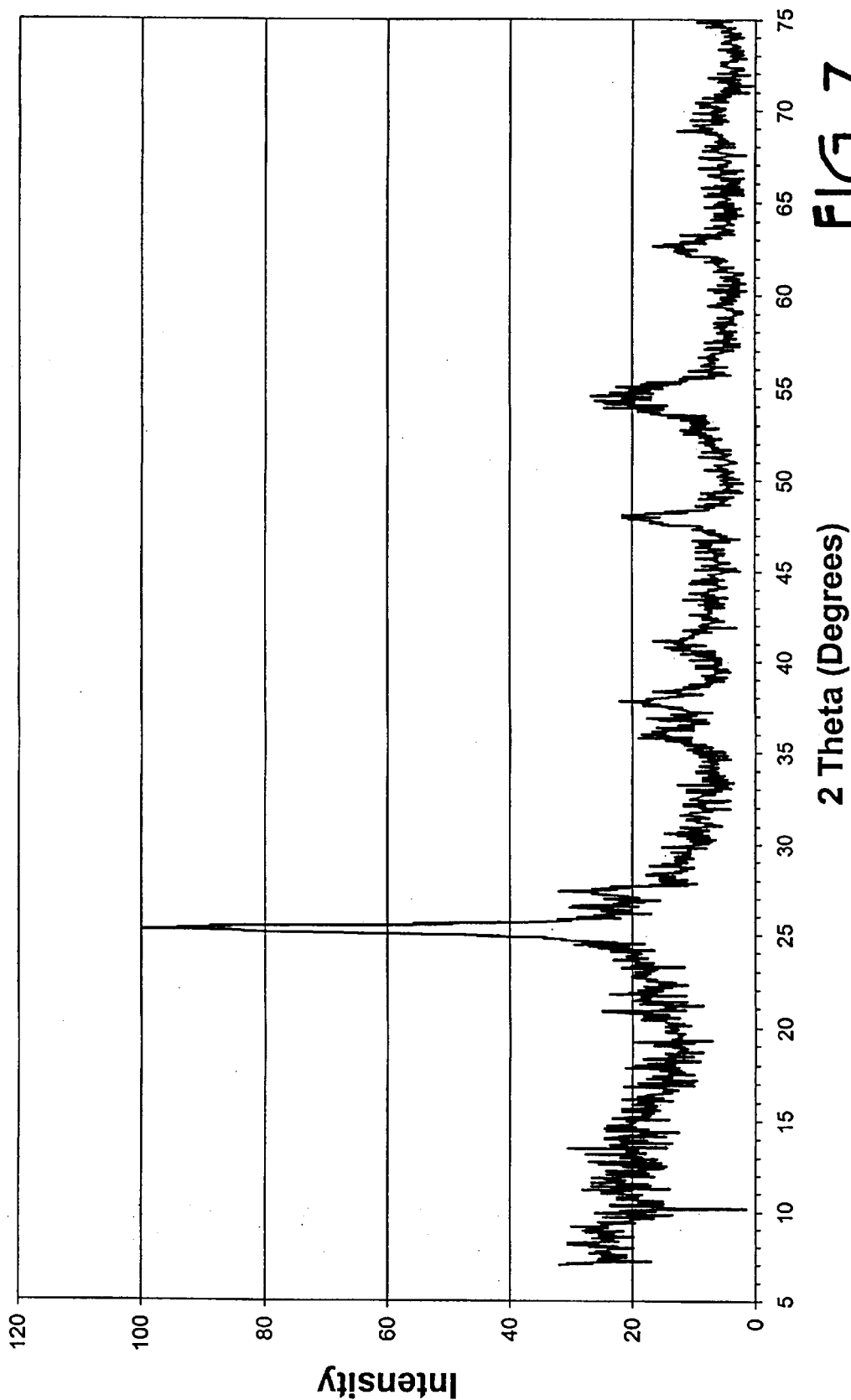
FIG. 7 is an x-ray diffractogram of titanium oxide/carbon composite nanoparticles produced by laser pyrolysis under conditions specified in the fourth column of Table 1.

Laser pyrolysis techniques have successfully produced crystalline metal oxide and silicon oxide particles both with associated carbon. The particles have average diameters on a nanometer scale. X-ray diffractograms of the particles yield diffraction spectra of the underlying metal oxides or silicon oxides. The associated carbon apparently is amorphous, and may form a surface coating on a metal (silicon) oxide core. The carbon may alter the chemical and physical properties of the particles. Furthermore, nanoparticles have been formed including $TiO_2$ with a rutile crystal structure as well as an anatase crystal structure.

The titanium oxide/carbon composite particles and the silicon oxide/carbon composite particles described in the Examples below are useful in making abrasive compositions for polishing surfaces such as semiconductor substrates. Other metal (silicon) oxide/carbon composite nanoparticles also are useful as abrasives.

To generate the desired metal (silicon) oxide/carbon composite nanoparticles, laser pyrolysis is used. Specifically, laser pyrolysis is an excellent process for efficiently producing metal (silicon) oxide particles with associated amorphous carbon. Furthermore, the resulting particles have a narrow distribution of average particle diameters and other advantageous properties described below. During the laser pyrolysis process, the metal (silicon) or metal (silicon) compound acts as a catalyst for carbon formation under suitable conditions, as described below.

A basic feature of successful application of laser pyrolysis for the production of metal (silicon) oxide/carbon composite nanoparticles is the generation of a molecular stream containing a metal (silicon) compound precursor, a carbon source, a radiation absorber and a reactant serving as an oxygen source. The molecular stream is pyrolyzed by an intense laser beam. As the molecular stream leaves the laser beam, the particles are rapidly quenched.

A. Particle Production

Laser pyrolysis has been discovered to be a valuable tool for the production of nanoscale metal oxide or silicon oxide particles both with associated carbon. Suitable precursors are introduced to a reactant stream to provide a metal (silicon) source, an oxygen source and a carbon source. The reactant stream is pyrolyzed by an intense laser beam in a small reaction zone. The product particles quench rapidly after they leave the reaction zone.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Specific conditions used to produce titanium oxide particles, titanium oxide/carbon composite particles and silicon oxide/carbon composite particles in a particular apparatus are described below in the Examples. In addition, some general observations on the relationship between reaction conditions and the resulting particles can be made.

Increasing the laser power results in increased reaction temperatures in the reaction region as well as a faster quenching rate. A rapid quenching rate tends to favor production of high energy phases, which may not be obtained with processes near thermal equilibrium. Similarly, increasing the chamber pressure also tends to favor the production of higher energy structures. Also, increasing the concentration of the reactant serving as the oxygen source in the reactant stream favors the production of particles with increased amounts of oxygen.

Reactant gas flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different forms of a product compound have a tendency to form different size particles from other phases under relatively similar conditions. Laser power also influences particle size with increased laser power favoring larger particle formation for lower melting materials and smaller particle formation for higher melting materials.

In order to form a carbon coating, a sufficient laser power must be used to dissociate the carbon source. While particular values may depend on the particular set up of the apparatus, generally a laser power greater than about 500 watts is needed to crack ethylene ($C_2H_4$) as a carbon source, while a laser power of about 200 watts or more generally is sufficient to crack benzene ($C_6H_6$) as a carbon source. Other carbon precursors decompose readily such as isopropyloxide ligands. Furthermore, relatively high reaction chamber pressures, greater than about 200 Torr depending on the exact chamber arrangement, are also desirable to form the carbon coatings. When reasonable quantities of oxygen are present, oxides usually are formed rather than the corresponding metal carbide.

Appropriate metal (silicon) precursor compounds generally include metal (silicon) compounds with reasonable vapor pressures, i.e., vapor pressures sufficient to get desired amounts of precursor vapor in the reactant stream. The vessel holding the precursor compounds can be heated to increase the vapor pressure of the metal compound precursor, if desired. Preferred titanium precursors include, for example, titanium tetrachloride ($TiCl_4$), and titanium isopropoxide (or titanium isopropylate, $Ti[OCH(CH_3)_2]_4$). Titanium isopropoxide can serve as both a metal precursor and as a carbon source. Preferred silicon precursors include, for example, silicon tetrachloride ($SiCl_4$), trichlorosilane ($Cl_3HSi$), trichloromethyl silane $CH_3SiCl_3$, and tetraethoxysilane ($Si(OC_2H_5)_4$, also known as ethyl silane and tetraethyl silane).

Preferred reactants serving as oxygen source include, for example, $O_2$, $CO$, $CO_2$, $O_3$ and mixtures thereof. The reactant compound from the oxygen source should not react significantly with the metal (silicon) precursor compound prior to entering the reaction zone since this generally would result in the formation of large particles.

Laser pyrolysis for the formation of carbon coatings preferably is performed with an infrared laser, although other intense non-laser infrared sources can be used. $CO_2$ lasers are particularly preferred sources of laser light. Suitable infrared absorbers for inclusion in the molecular stream include, for example, $C_2H_4$, $NH_3$, $SF_6$, $SiH_4$ and $O_3$. $C_2H_4$ can act as both an infrared absorbed and as a carbon source. $O_3$ can act as both an infrared absorber and as an oxygen source. The radiation absorber, such as the infrared absorber, absorbs energy from the radiation beam and distributes the energy to the other reactants to drive the pyrolysis.

Preferably, the energy absorbed from the radiation beam increases the temperature at a tremendous rate, many times the rate that energy generally would be produced even by strongly exothermic reactions under controlled conditions. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant molecules and product particles contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant supply system produces a molecular stream through the reaction chamber. A laser beam path intersects the molecular stream at a reaction zone. The molecular stream continues after the reaction zone to an outlet, where the molecular stream exits the reaction chamber and passes into a collection system. Generally, the laser is located external to the reaction chamber, and the laser beam enters the reaction chamber through an appropriate window.

Referring to FIG. 1, a particular embodiment 100 of a pyrolysis apparatus involves a reactant supply system 102, reaction chamber 104, collection system 106 and laser 108. Reactant supply system 102 includes a carbon reactant source 118 and source 120 of metal (silicon) precursor compound. For liquid precursors, a carrier gas from carrier gas source 122 can be introduced into precursor source 120, containing liquid precursor to facilitate delivery of the precursor. The carrier gas from source 122 preferably is either an infrared absorber, an inert gas or a carbon source and is preferably bubbled through the liquid, precursor compound. The quantity of precursor vapor in the reaction zone is roughly proportional to the flow rate of the carrier gas.

Alternatively, carrier gas can be supplied directly from carbon reactant source 118, infrared absorber source 124 or inert gas source 126, as appropriate. The reactant providing the oxygen is supplied from oxygen reactant source 128, which can be a gas cylinder or other suitable container. The gases from the precursor source 120 are mixed with gases from carbon reactant source 118, reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into rectangular channel 134, which forms part of an injection nozzle for directing reactants into reaction chamber 104.

Flow from sources 118, 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactant gases to form a reactant stream in the reaction chamber. Annular opening 204 has, for example, a diameter of about 1.5 inches and a width along the radial direction from about ⅛ in to about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably cylindrical lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J.

Reactants passing through slit 206 in injection nozzle 202 initiate a molecular stream. The molecular stream passes through reaction zone 224, where reaction involving the metal compound precursor compound takes place. Heating of the gases in reaction zone 224 is extremely rapid, roughly on the order of $10^5$ degree C/sec depending on the specific conditions. The reaction is rapidly quenched upon leaving reaction zone 224, and particles 228 are formed in the molecular stream. The nonequilibrium nature of the process allows for the production of nanoparticles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The preferred chamber pressure for the production of the desired composites generally ranges from about 80 Torr to about 500 Torr.

Reaction chamber 104 has two additional tubular sections not shown. One of the additional tubular sections projects into the plane of the sectional view in FIG. 1, and the second additional tubular section projects out of the plane of the sectional view in FIG. 1. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 can include a curved channel 250 leading from collection nozzle 230. Because of the small size of the particles, the product particles follow the flow of the gas around curves. Collection system 106 includes a filter 252 within the gas flow to collect the product particles. A variety of materials such as Teflon®, glass fibers and the like can be used for the filter as long as the material is inert and has a fine enough mesh to trap the particles. Preferred materials for the filter include, for example, a glass fiber filter from ACE Glass Inc., Vineland, N.J. and a cylindrical polypropylene filter from Cole-Parmer Instrument Co., Vernon Hills, Ill.

Pump 254 is used to maintain collection system 106 at a selected pressure. A variety of different pumps can be used. Appropriate pumps for use as pump 254 include, for example, Busch Model B0024 pump from Busch, Inc., Virginia Beach, Va. With a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient particles are collected on filter 252 such that the pump can no longer maintain the desired pressure in the reaction chamber 104 against the resistance through filter 252. When the pressure in reaction chamber 104 can no longer be maintained at the desired value, the reaction is stopped, and the filter 252 is removed. With this embodiment, about 1–90 grams of particles can be collected in a single run before the chamber pressure can no longer be maintained. A single run generally can last up to about 6 hours depending on the type of particle being produced and the type of filter being used. Therefore, it is straightforward to produce a macroscopic quantity of particles, i.e., a quantity visible with the naked eye.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the bottom of the reaction chamber, and the product particles are collected from the top of the chamber. This alternative configuration can result in a slightly higher collection of product since nanoscale particles tend to be buoyant in the surrounding gases. In this configuration, it is preferable to include a curved section in the collection system so that the collection filter is not mounted directly above the reaction chamber.

An alternative design of a laser pyrolysis apparatus has been described. See, U.S. Pat. No. 5,958,348 entitled "Efficient Production of Particles by Chemical Reaction," incorporated herein by reference. This alternative design is intended to facilitate production of commercial quantities of particles by laser pyrolysis. A variety of configurations are described for injecting the reactant materials into the reaction chamber.

The alternative apparatus includes a reaction chamber designed to minimize contamination of the walls of the chamber with particles, to increase the production capacity and to make efficient use of resources. To accomplish these objectives, the reaction chamber conforms generally to the shape of an elongated reactant inlet, decreasing the dead volume outside of the molecular stream. Gases can accumulate in dead volume, increasing the amount of wasted radiation through scattering or absorption by nonreacting molecules. Also, due to reduced gas flow in dead volume, particles can accumulate in dead volume causing chamber contamination.

The design of the improved reaction chamber 300 is schematically shown in FIGS. 2 and 3. A reactant gas channel 302 is located within block 304. Facets 306 of block 304 form a portion of conduits 308. Another portion of conduits 308 join at edge 310 with an inner surface of main chamber 312. Conduits 308 terminate at shielding gas inlets 314. Block 304 can be repositioned or replaced, depending on the reaction and desired conditions, to vary the relationship between the elongated reactant inlet 316 and shielding gas inlets 314. The shielding gases from shielding gas inlets 314 form blankets around the molecular stream originating from reactant inlet 316.

The dimensions of elongated reactant inlet 316 preferably are designed for high efficiency particle production. Reasonable dimensions for the reactant inlet for the production of the metal oxide/carbon composite particles, when used with a 1800 watt $CO_2$ laser, are from about 5 mm to about 1 meter.

Main chamber 312 conforms generally to the shape of elongated reactant inlet 316. Main chamber 312 includes an outlet 318 along the molecular stream for removal of particulate products, any unreacted gases and inert gases. Tubular sections 320, 322 extend from the main chamber 312. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322.

The improved apparatus includes a collection system to remove the particles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 1. The configuration of the reactant injection components and the collection system can be reversed such that the particles are collected at the top of the apparatus.

B. Particle Properties

A collection of particles of interest generally has an average diameter for the primary particles of less than about a micron, preferably from about 5 nm to about 500 nm, more preferably from about 5 nm to about 100 nm, and even more preferably from about 5 nm to about 50 nm. The primary particles usually have a roughly spherical gross appearance. Upon closer examination, the metal oxide particles generally have facets corresponding to the underlying crystal lattice. Nevertheless, the primary particles tend to exhibit growth that is roughly equal in the three physical dimensions to give a gross spherical appearance. The carbon coated primary particles generally have a core of metal oxide with facets corresponding to the underlying crystal lattice and a roughly spherical coating over the metal oxide core with few, if any, sharp appendages. Generally, 95 percent of the primary particles, and preferably 99 percent, have ratios of the dimension along the major axis to the dimension along the minor axis less than about 2. Diameter measurements on particles with asymmetries are based on an average of length measurements along the principle axes of the particle.

Because of their small size, the primary particles tend to form loose agglomerates due to van der Waals and other electromagnetic forces between nearby particles. Nevertheless, the nanometer scale of the primary particles is clearly observable in transmission electron micrographs of the particles. The particles generally have a surface area corresponding to particles on a nanometer scale as observed in the micrographs. Furthermore, the particles can manifest unique properties due to their small size and large surface area per weight of material. For example, $TiO_2$ nanoparticles generally exhibit altered electromagnetic absorption properties based on their small size, as described in copending and commonly assigned U.S. patent application Ser. No. 08/962,515, entitled "Ultraviolet Light Block and Photocatalytic Materials," incorporated herein by reference.

The primary particles preferably have a high degree of uniformity in size. As determined from examination of transmission electron micrographs, the primary particles generally have a distribution in sizes such that at least about 95 percent, and preferably 99 percent, of the primary particles have a diameter greater than about 40 percent of the average diameter and less than about 160 percent of the average diameter. Preferably, the primary particles have a distribution of diameters such that at least about 95 percent of the primary particles have a diameter greater than about 60 percent of the average diameter and less than about 140 percent of the average diameter.

Particles formed in a mixed phase region can exhibit a broader distribution that would seem to correspond to a bimodal distribution. Such a bimodal distribution is indicative that the different types of particles form with a particular distribution specific for that type of particle under the particular reaction conditions. The presence of a bimodal distribution would suggest that the particular crystalline phases are segregated from each other with respect to distinct primary particles.

Furthermore, essentially no primary particles have an average diameter greater than about 4 times the average diameter and preferably 3 times the average diameter, and more preferably 2 times the average diameter. In other words, the particle size distribution effectively does not have a tail indicative of a small number of particles with significantly larger sizes. This is a result of the small reaction region and corresponding rapid quench of the particles. An effective cut off in the tail indicates that there are less than about 1 particle in $10^6$ have a diameter greater than a particular cut off value above the average diameter. The mixed phase materials also have a sharp cut off at higher particle sizes since the individual distributions each have a sharp cut off.

In addition, the nanoparticles generally have a very high purity level. The crystalline metal oxide components of the composite nanoparticles produced by the above described methods are expected to have a purity greater than the reactant gases because the crystal formation process tends to exclude contaminants from the lattice. Furthermore, metal oxide particles produced by laser pyrolysis have a high degree of crystallinity. In view of the small particle size and uniformity in size, the particles described herein are particularly suitable for abrasive applications.

Since the carbon does not exhibit peaks in the x-ray diffractogram indicative of a crystalline phase, the carbon associated with the crystalline metal oxide apparently is amorphous. The carbon coating does produce a broad peak at about 23° and a broad peak at low scattering angles. Such peaks previously have been associated with amorphous carbon, see Bi et al., "Nanoscale carbon blacks produced by $CO_2$ laser pyrolysis," J. Mater. Research 10:2875–2884 (1995), incorporated herein by reference.

Since the x-ray diffractogram does not indicate disruption of the metal oxide lattice, the carbon evidently is located predominantly external to the metal oxide lattice. An examination of the TEM micrographs suggests that the carbon is located as a coating surrounding a core of metal oxide. Generally, the carbon deposits form from about 1 percent by weight to about 80 percent by weight of the collection of particles and more preferably about 5 percent to about 80 percent by weight. Trace quantities of carbon significantly less than about 1 percent by weight would be an impurity that cannot reasonably be considered a carbon deposit.

The amorphous carbon component of the composite particles would be expected to have similar properties as amorphous carbon particles produced by laser pyrolysis. Such amorphous carbon nanoparticles (laser black) are described in Bi, et al., "Nanoscale carbon blacks produced by $CO_2$ laser pyrolysis," J. Mater. Research 10:2875–2884 (1995), incorporated herein by reference. Bi et al. found that the amorphous carbon had a small amount of hydrogen, C:H about 8–10:1, and a minute amount of iron impurity, C:Fe about 1000:1 resulting from an iron compound in the reaction stream.

Titanium dioxide is known to exist in three crystalline phases, anatase, rutile and brookite. The anatase and rutile phases have tetragonal crystal structures, and the brookite phase has an orthorhombic crystal structure. Although under certain conditions mixed phase materials are formed, laser pyrolysis generally can be used effectively to produce single phase crystalline particles. The conditions of the laser pyrolysis can be varied to favor the formation of a single, selected phase of crystalline $TiO_2$ with associated carbon. Similar control can be applied to the formation of other crystalline metal oxides with associated carbon.

While the silicon oxide cores described herein are amorphous, they generally are uniform in composition, size and shape. A high degree of uniformity is a characteristic of laser pyrolysis generally.

As noted above, the titanium oxide/carbon composite particles and the silicon oxide/carbon composite particles can be used advantageously in the production of abrasives for surface polishing. Similarly, other metal oxide/carbon composite nanoparticles also can be used in the production of abrasives. The use of nanoscale metal oxide particles in the production of improved abrasives is described in copending and commonly assigned patent application Ser. No. 08/961,735 to Kambe et al., entitled "Abrasive Particles for Surface Polishing," incorporated herein by reference and in copending and commonly assigned patent application Ser. No. 09/085,514 to Kumar et al., entitled "Silicon Oxide Particles," incorporated herein by reference.

In particular, the polishing composition can involve the metal (silicon) oxide/carbon composite particles alone. More preferably, the polishing composition should include the abrasive particles dispersed in an aqueous or nonaqueous solution. The solution generally includes a solvent such as water, alcohol, acetone or the like. The polishing composition generally includes from about 0.05 percent to about 50 percent, and preferably from about 0.1 percent to about 10 percent by weight abrasive metal (silicon) oxide/carbon composite particles.

EXAMPLES

Example 1

Titanium Oxide/Carbon Composites

The synthesis of titanium dioxide particles and titanium dioxide/carbon composite particles described in this example was performed by laser pyrolysis. The particles were produced using essentially the laser pyrolysis apparatus of FIG. 1, described above.

The titanium tetrachloride (Strem Chemical, Inc., Newburyport, Mass.) precursor vapor was carried into the reaction chamber by bubbling Ar gas through $TiCl_4$ liquid in a container at room temperature. $C_2H_4$ gas was used as a laser absorbing gas, and argon was used as an inert gas. The ethylene was the source of carbon for forming the titanium dioxide/carbon composite particles. The reaction gas mixture containing $TiCl_4$, Ar, $O_2$ and $C_2H_4$ was introduced into the reactant gas nozzle for injection into the reaction chamber. The reactant gas nozzle had an opening with dimensions as specified in the last row of Table 1. The production rate of titanium dioxide particles and titanium dioxide/carbon composite particles was typically about 4 g/hr. Additional parameters of the laser pyrolysis synthesis relating to the particles of Example 1 are specified in Table 1.

TABLE 1

| Sample | 1 | 2 | 3 | 4 |
|---|---|---|---|---|
| Crystalline Phase | Anatase | Anatase & Rutile | Anatase | Anatase & Rutile |
| Crystal Structure | Tetragonal | Tetragonal | Tetragonal | Tetragonal |
| Pressure (Torr) | 220 | 110 | 350 | 320 |
| Argon - Win. (sccm) | 700 | 700 | 700 | 700 |
| Argon - Sld. (slm) | 5.6 | 2.8 | 4.2 | 7.92 |
| Ethylene (sccm) | 603 | 603 | 603 | 1340 |
| Carrier Gas (Ar) (sccm) | 196 | 196 | 283 | 714 |
| Oxygen (sccm) | 252 | 382 | 300 | 550 |
| Laser Output (watts) | 520 | 520 | 520 | 450 |
| Nozzle Size | 5/8 in × 1/8 in | 5/8 in × 1/8 in | 5/8 in × 1/8 in | 5/8 in × 1/8 in | sccm = standard cubic centimeters per minute
slm = standard liters per minute
Argon - Win. = argon flow through inlets 216, 218
Argon - Sld. = argon flow through annular channel 142

To evaluate the atomic arrangement, the samples were examined by x-ray diffraction using the Cu(Kα) radiation line on a Siemens D500 x-ray diffractometer. X-ray diffractograms for samples produced under the conditions specified in the four columns of Table 1 are shown in FIGS. 4–7, respectively. Under the conditions specified in columns 1 and 3 of Table 1, the titanium dioxide components of the particles had a crystalline phase of anatase titanium dioxide. The diffractograms in FIGS. 4, 6 and 7 have broad peaks at about 23° and at low scattering angles indicative of amorphous carbon.

In comparison, the titanium dioxide particles produced under the conditions shown in the second and fourth column of Table 1 had a crystal structure indicating mixed phases of anatase and rutile titanium dioxide. Under the conditions specified in the fourth column of Table 1 only a small portion of rutile titanium dioxide was formed. Furthermore, the diffractogram in FIG. 5 does not have peaks indicative of amorphous carbon. At relatively low reaction chamber pressures such as those indicated in column 2 of Table 1, the other reaction parameters such as laser power can be adjusted to yield pure samples of anatase titanium dioxide or rutile titanium dioxide.

Figure 8:
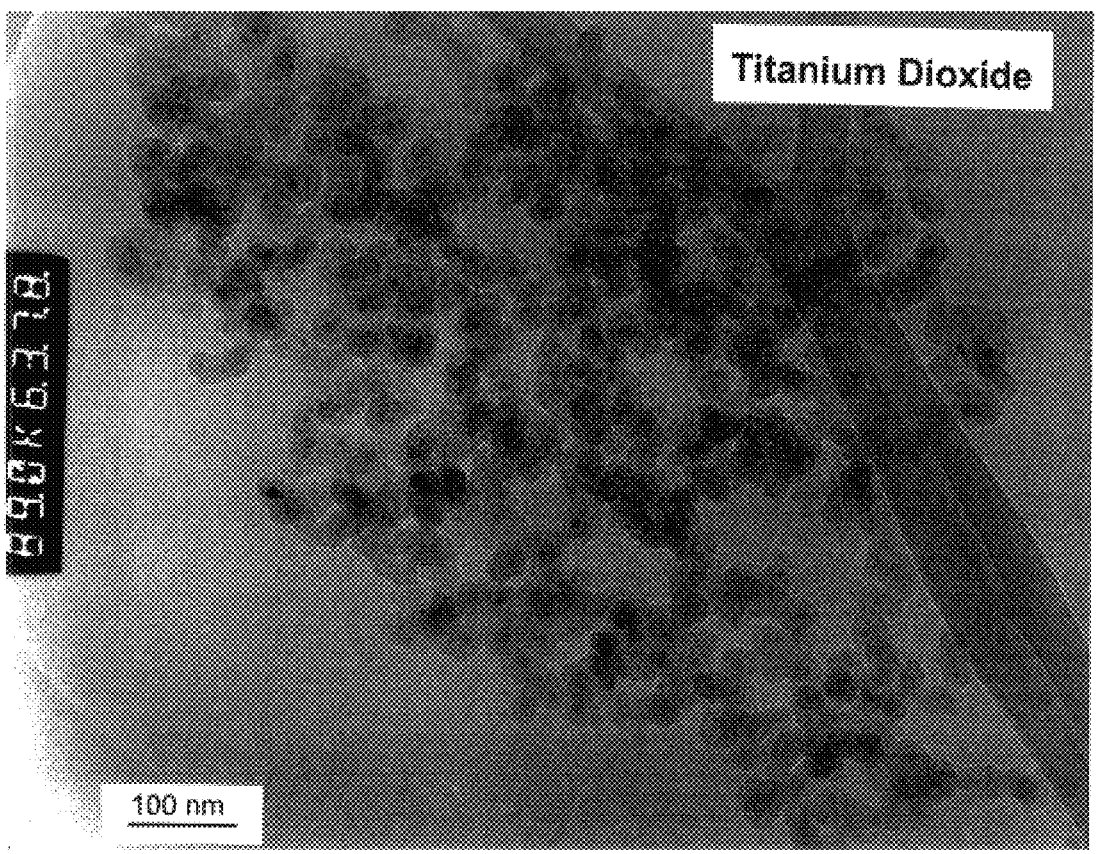
FIG. 8 is a TEM micrograph of titanium oxide/carbon composite nanoparticles produced by laser pyrolysis under conditions specified in the first column of Table 1.
Figure 9:
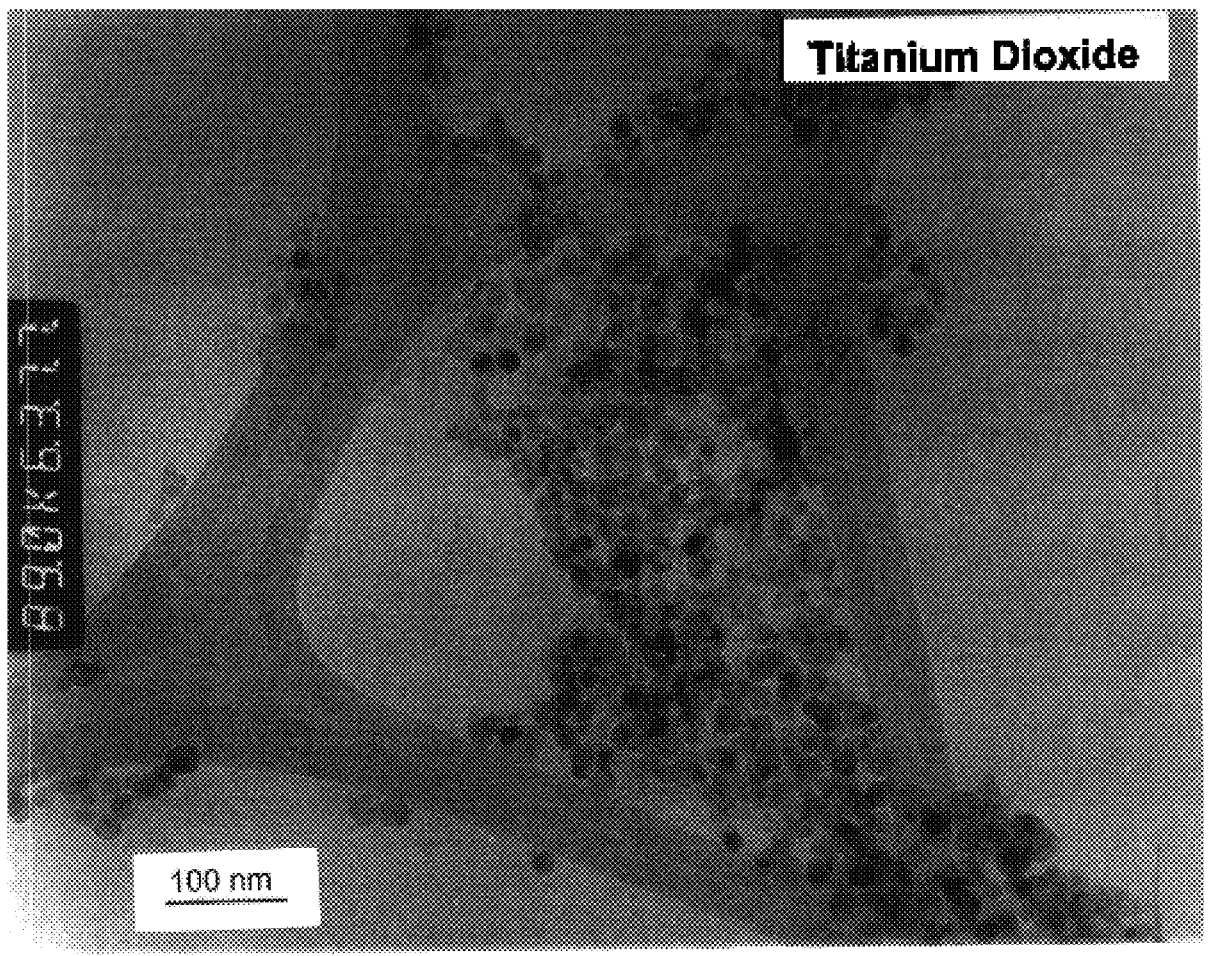
FIG. 9 is a TEM micrograph of titanium oxide nanoparticles produced by laser pyrolysis under conditions specified in the second column of Table 1.

Transmission electron microscopy (TEM) was used to determine particle sizes and morphology. TEM micrographs for the particles produced under the conditions in the four columns of Table 1 are displayed in FIGS. 8–11, respectively. The particles in the TEM micrographs of FIGS. 8 and 10 have visible coatings presumably corresponding to the amorphous carbon. The particles are quite spherical in shape. The cores are presumably formed from titanium oxide. Also, the cores seem to have facets corresponding to the crystal lattice of the titanium oxide.

Figure 10:
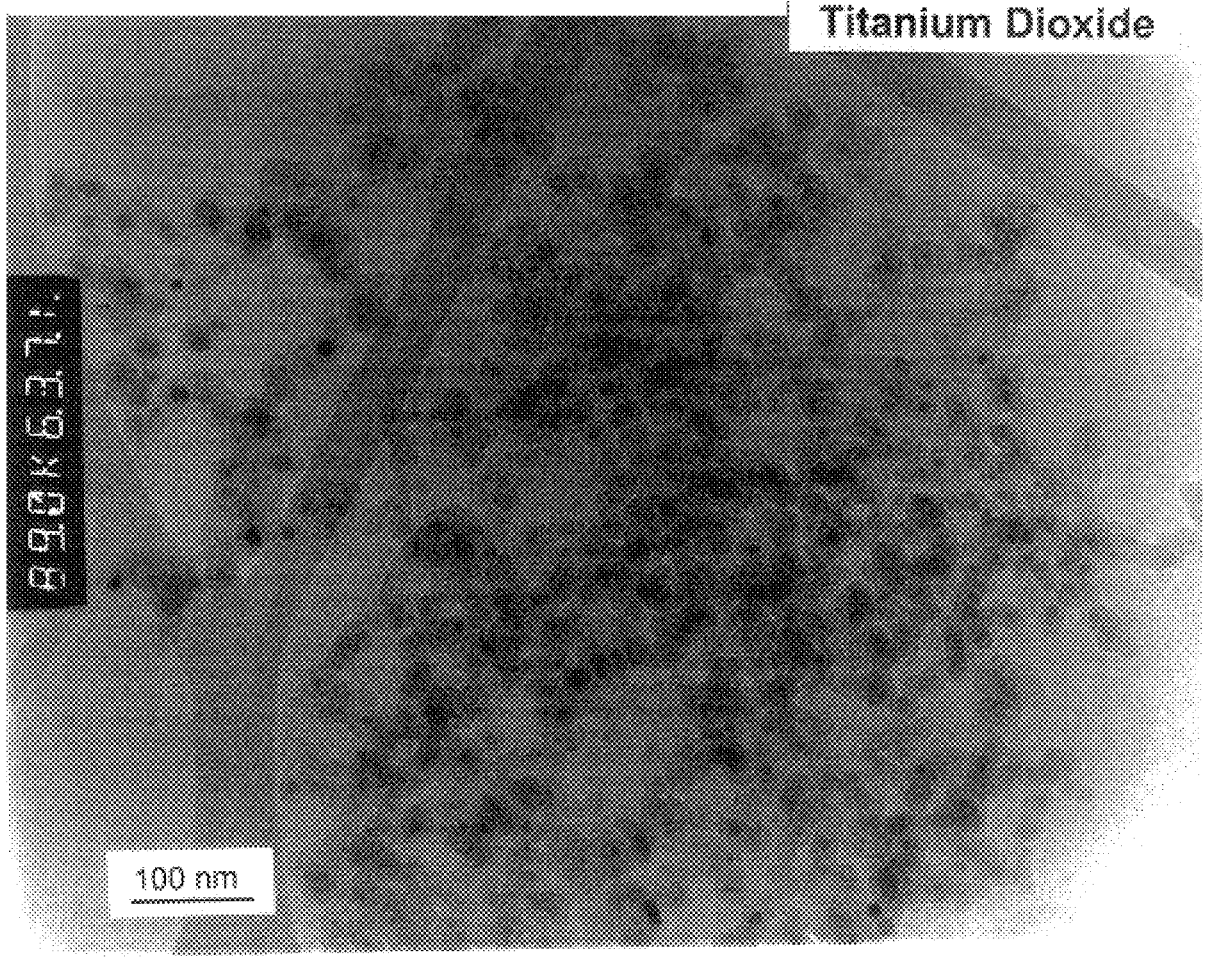
FIG. 10 is a TEM micrograph of titanium oxide/carbon composite nanoparticles produced by laser pyrolysis under conditions specified in the third column of Table 1.
Figure 11:
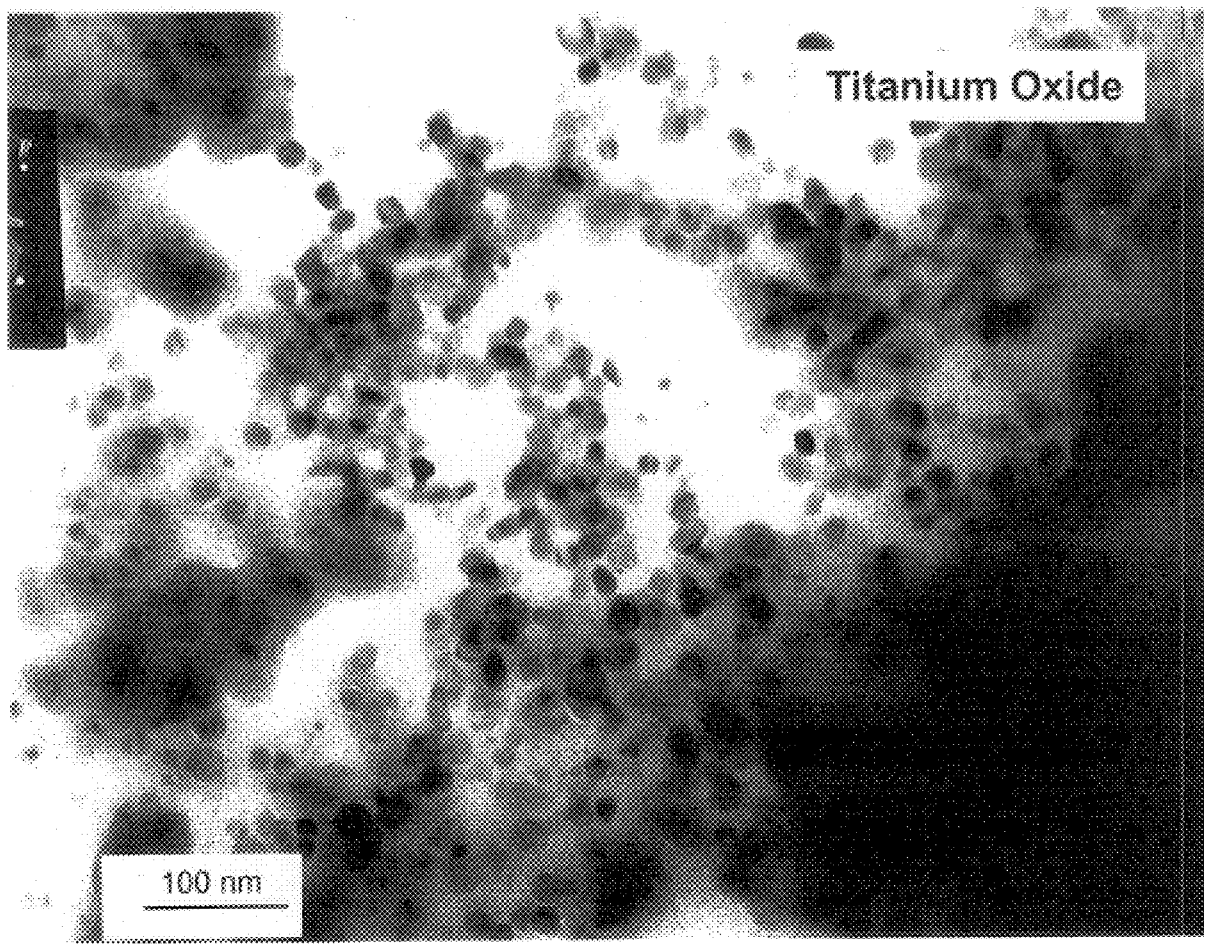
FIG. 11 is a TEM micrograph of titanium oxide/carbon composite nanoparticles produced by laser pyrolysis under conditions specified in the fourth column of Table 1.
Figure 12:
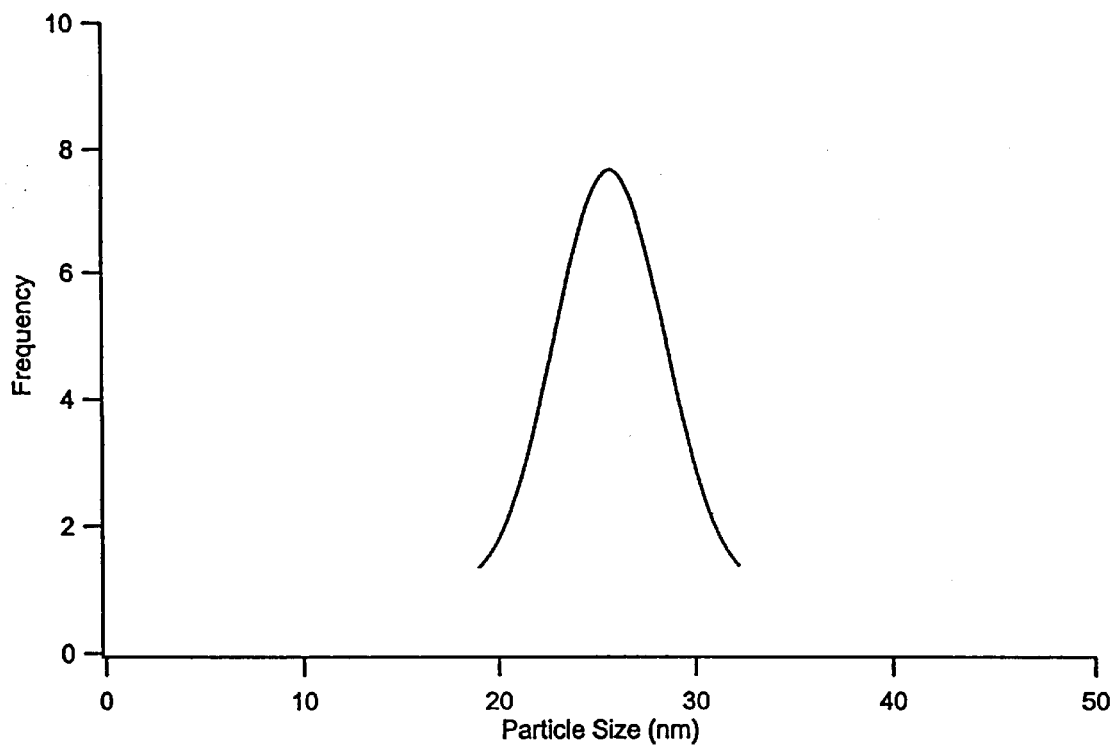
FIG. 12 is a plot of a particle size distribution obtained from the TEM micrograph of FIG. 10.

An examination of a portion of the TEM micrograph in FIG. 10 yielded an average particle size of about 25 nm. The corresponding particle size distribution is shown in FIG. 12. The approximate size distribution was determined by manually measuring diameters of the particles distinctly visible in the micrograph of FIG. 10. Only those particles having clear particle boundaries were measured to avoid regions distorted or out of focus in the micrograph. Measurements so obtained should be more accurate and are not biased since a single view cannot show a clear perspective of all particles. It is significant that the particles span a rather narrow range of sizes.

Figure 13:
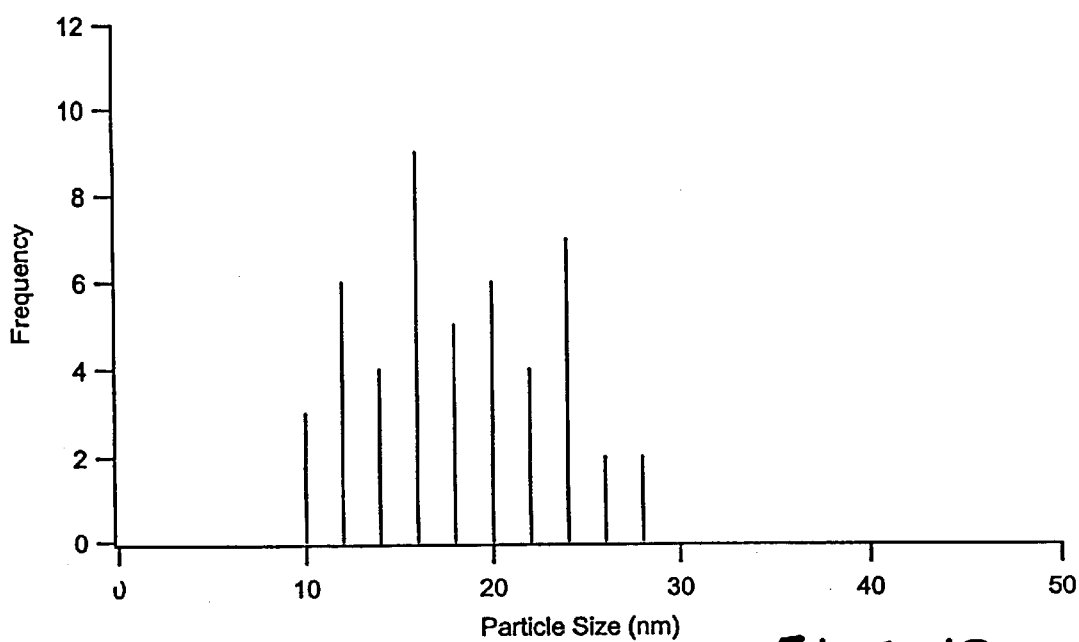
FIG. 13 is a plot of a particle size distribution obtained from the TEM micrograph of FIG. 9.

The particle size distribution for the mixed phase materials produced under the conditions specified in column 2 of Table 1 is shown in FIG. 13. The distribution in FIG. 13 is broader than the distribution shown in FIG. 12. The distribution in FIG. 13 is consistent with a bimodal distribution with one component of the distribution corresponding to the anatase phase and a second component of the distribution corresponding to the rutile phase. This bimodal distribution suggests that the two phases are segregated into different nanoparticles. Nevertheless, the distribution in FIG. 13 is relatively narrow and does not have a tail, i.e., no particle have diameters significantly larger than a few multiples of the average diameter.

The particles had a dark color upon visual inspection. The darkness apparently was due at least partially to the deposits on the particles of amorphous carbon. The particles formed under the conditions indicated in the second column of Table 1, which apparently lacked carbon deposits, were less dark than the other particles. Thus, there may have been a contribution to the darkness besides the presence of carbon deposits.

An elemental analysis of the particles produced under the conditions of the fourth column of Table 1 was performed. The particles included 55.18 percent by weight carbon and 19.13 percent by weight titanium. Chlorine contamination was found to be 0.42 percent by weight. Oxygen was not directly measured but presumably accounted for most of the remaining weight. The elemental analysis was performed by Desert Analytics, Tucson, Ariz.

Example 2

Silicon Oxide/Carbon Composites

The synthesis of silicon oxide/carbon composite particles described in this example was performed by laser pyrolysis. The particles were produced using essentially the laser pyrolysis apparatus of FIG. 1, described above.

Silicon tetrachloride (Strem Chemical, Inc., Newburyport, Mass.) precursor vapor was carried into the reaction chamber by bubbling Ar gas through $SiCl_4$ liquid in a container at room temperature. $C_2H_4$ gas was used as a laser absorbing gas and as a carbon source, and argon was used as an inert gas. The reaction gas mixture containing $SiCl_4$, Ar, $O_2$ and $C_2H_4$ was introduced into the reactant gas nozzle for injection into the reaction chamber. The reactant gas nozzle had an opening with dimensions as specified in the last row of Table 2. Additional parameters of the laser pyrolysis synthesis relating to the particles in this Example are specified in Table 2.

TABLE 2

| Sample | 1 |
|---|---|
| Crystal Structure | Amorphous |
| Pressure (Torr) | 310 |
| Argon - Win. (sccm) | 700 |

TABLE 2-continued

| Sample | 1 |
|---|---|
| Argon - Sld. (slm) | 8.96 |
| Argon - Dil. (sccm) | 980 |
| Ethylene (sccm) | 670 |
| Carrier Gas (sccm) | 238 (Ar) |
| Oxygen (sccm) | 550 |
| Laser Output (watts) | 430 |
| Nozzle Size | ⅝ in × ⅛ in | sccm = standard cubic centimeters per minute
slm = standard liters per minute
Argon - Win. = argon flow through inlets 216, 218
Argon - Sld. = argon flow through annular channel 142
Argon - Dil. = additional argon added to the reaction stream besides the argon carrier gas.

The use of additional argon gas to dilute the reaction stream resulted in production of particles that were less agglomerated.

Figure 14:
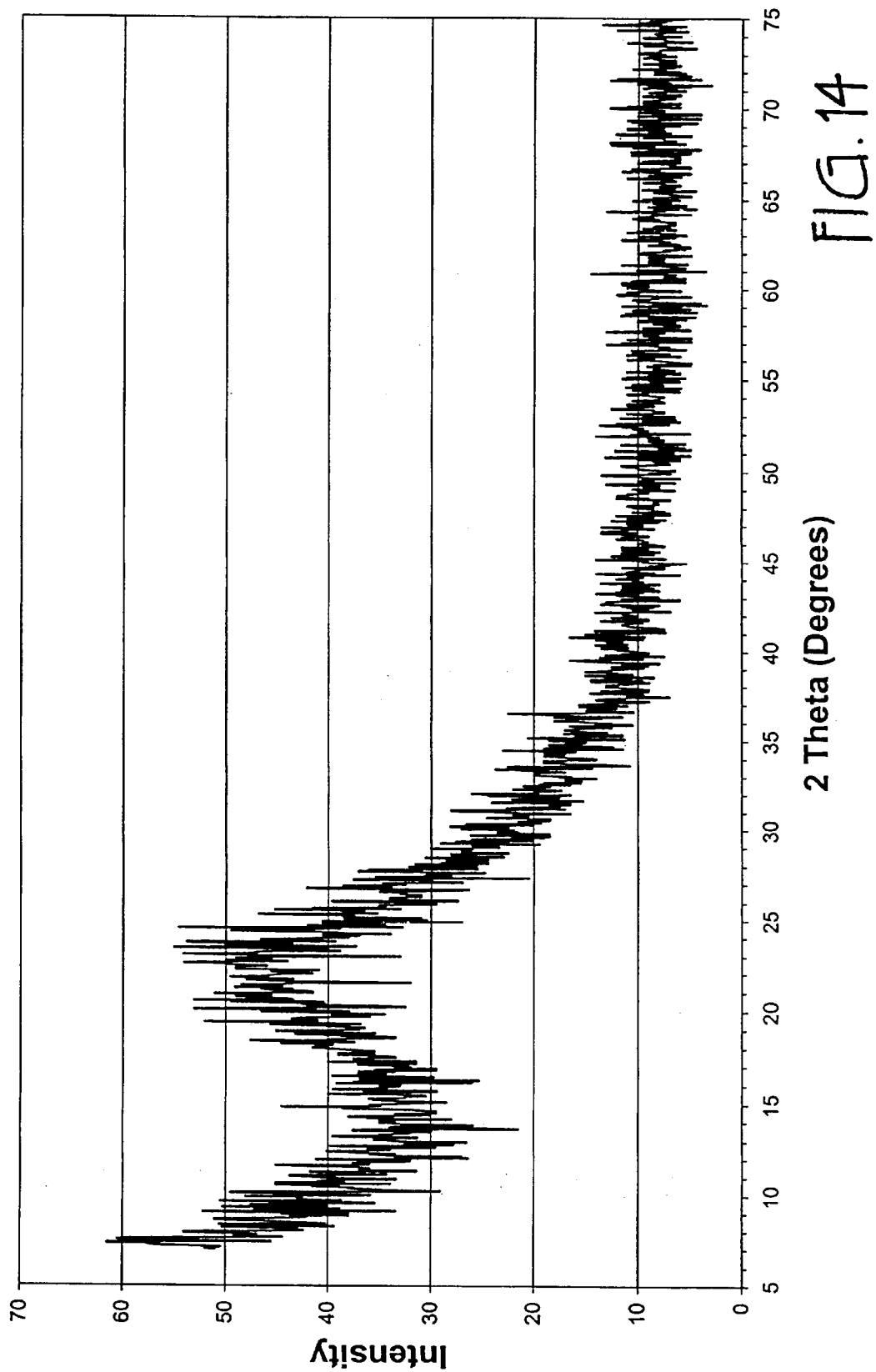
FIG. 14 is an x-ray diffractogram of silicon oxide/carbon composite nanoparticles produced by laser pyrolysis under conditions specified in Table 2.
Figure 15:
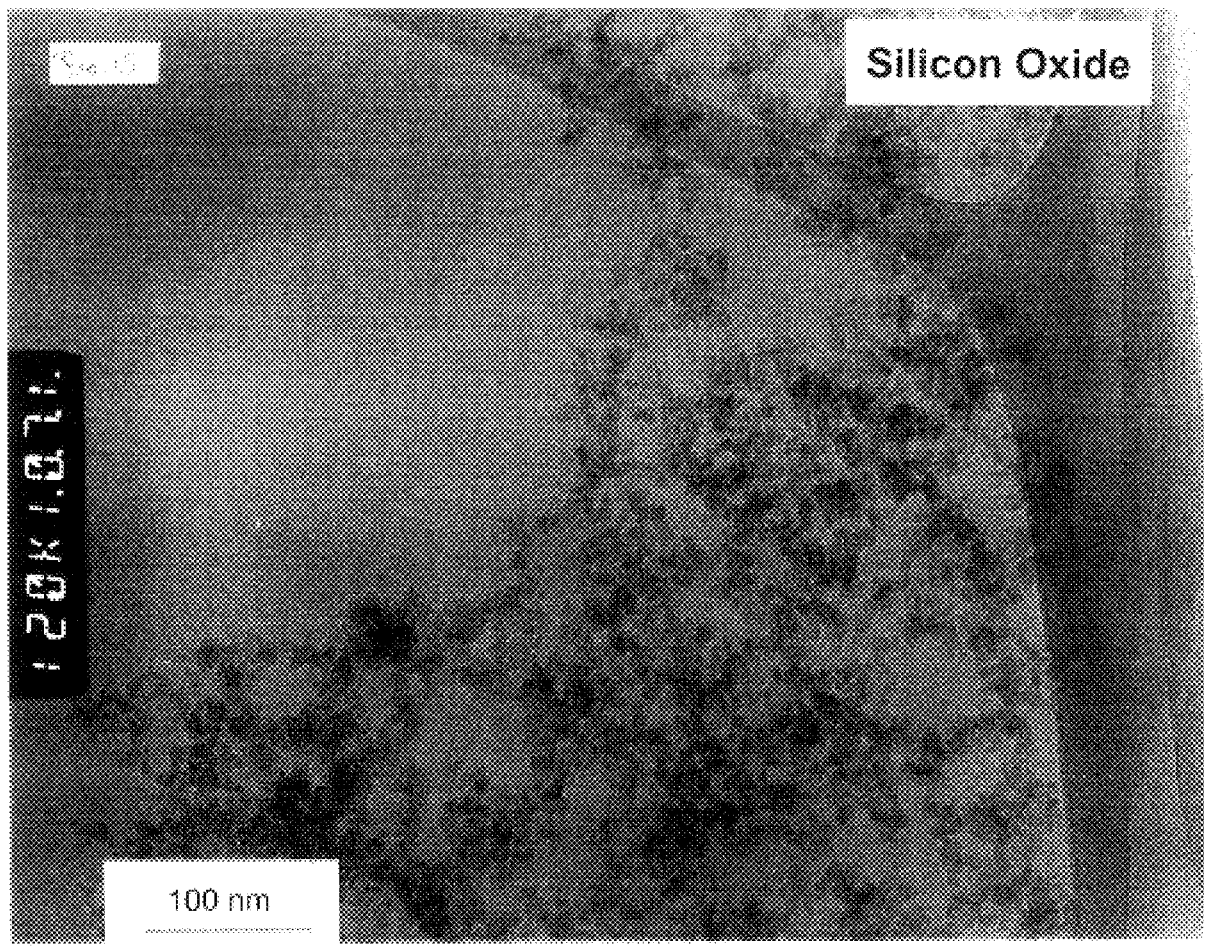
FIG. 15 is a TEM micrograph of silicon oxide/carbon composite nanoparticles produced by laser pyrolysis under conditions specified in Table 2.

The production rate of silicon oxide/carbon composite particles was typically about 30 g/hr. Under the conditions specified in Table 2, amorphous silicon oxide particles were produced with carbon deposits. To evaluate the atomic arrangement, the samples were examined by x-ray diffraction using the Cu(Kα) radiation line on a Siemens D500 x-ray diffractometer. An x-ray diffractogram for a sample produced under the conditions specified in Table 2 is shown in FIG. 14. The broad peak in FIG. 14 is indicative of an amorphous sample. A TEM micrograph for the particles produced under the conditions of Table 2 is displayed in FIG. 15.

The particles had a dark color upon visual inspection. The darkness presumably was due to deposits on the particles of elemental carbon from the ethylene in the reactant stream. The dark color could be eliminated upon heating for a couple of hours in an oxygen environment in an oven at temperatures on the order of 500° C.

An elemental analysis of the particles produced by laser pyrolysis under the conditions in Table 2 revealed a carbon content of 5.29 percent by weight and a silicon content of 45.67 percent by weight. The sample had a chlorine contamination of 0.41 percent by weight. Presumably, the remaining weight was mostly oxygen, which was not directly measured in the elemental analysis. If the remaining material was oxygen, this would correspond approximately to a silicon oxide composition of about $SiO_2$, although some oxygen may be missing from the lattice.

The embodiments described above are intended to be representative and not limiting. Additional embodiments of the invention are within the claims. Although the present invention has been described with reference to preferred embodiments, workers skilled in the art will recognize that changes may be made in form and detail without departing from the spirit and scope of the invention.

What is claimed is:

1. A collection of particles comprising:
    a) an oxide selected from the group consisting of metal oxide or silicon oxide, and;
    b) at least about 5 percent by weight carbon, the collection of particles having an average diameter from about 5 nm to about 250 nm.

2. The collection of particles of claim 1 wherein the collection of particle have an average diameter from about 5 nm to about 100 nm.

3. The collection of particles of claim 1 wherein the collection of particles have an average diameter from about 5 nm to about 50 nm.

4. The collection of particles of claim 1 wherein the carbon is amorphous.

5. The collection of particles of claim 1 wherein the oxide comprises titanium dioxide.

6. The collection of particles of claim 1 wherein the oxide comprises crystalline metal oxide.

7. The collection of particles of claim 1 wherein the oxide comprises crystalline metal oxide core coated with carbon.

8. The collection of particles of claim 1 wherein the oxide comprises silicon dioxide.

9. The collection of particles of claim 1 wherein 95 percent of the particles have a diameter greater than about 40 percent of the average diameter and less than about 160 percent of the average diameter.

10. The collection of particles of claim 1 wherein effectively no particles have a diameter greater than about four times the average diameter.

11. The collection of particles of claim 1 wherein 95 percent of the particles have ratios of the dimension along the particle's major axis to the dimension along the particle's minor axis less than about 2.

12. The collection of particles of claim 1 wherein the collection of particle comprises at least about 10 percent by weight carbon.

13. A method of producing particles comprising an oxide selected from the group consisting of metal oxide and silicon oxide, and a carbon deposit, the method comprising pyrolyzing a molecular stream in a reaction chamber, the molecular stream comprising a metal precursor or silicon precursor, an oxidizing agent, an infrared absorber and a carbon source, where the pyrolysis is driven by heat absorbed from a laser beam under conditions suitable to generate a carbon deposit and the oxidizing agent is selected from the group consisting of $O_2$, $O_3$, CO, $CO_2$ and mixtures thereof.

14. The method of claim 13 wherein the oxide comprises titanium oxide.

15. The method of claim 14 wherein the metal precursor or silicon precursor is selected from the group consisting of titanium tetrachloride and titanium isopropoxide.

16. The method of claim 13 wherein the carbon source comprises $C_2H_4$ or $C_6H_6$.

17. The method of claim 13 wherein the particle have an average diameter from about 5 nm to about 1000 nm.

18. A collection of particles comprising:
    a) an oxide selected from the group consisting of metal oxide and silicon oxide, and;
    b) at least about 1 percent by weight carbon, the collection of particles having an average diameter from about 5 nm to about 100 nm.

19. The collection of particles of claim 18 wherein the oxide comprises crystalline metal oxide.

20. The collection of particles of claim 18 wherein 95 percent of the particles have a diameter greater than about 40 percent of the average diameter and less than about 160 percent of the average diameter.

* * * * *